(12) United States Patent
Smetana et al.

(10) Patent No.: US 8,967,303 B2
(45) Date of Patent: Mar. 3, 2015

(54) MOVABLE SYSTEM

(75) Inventors: Tomas Smetana, Herzogenaurach (DE);
Raphael Fischer, Herzogenaurach (DE);
Bernd Gombert, Seefeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 137 days.

(21) Appl. No.: 13/521,627

(22) PCT Filed: Apr. 13, 2011

(86) PCT No.: PCT/EP2011/055758
§ 371 (c)(1),
(2), (4) Date: Jul. 11, 2012

(87) PCT Pub. No.: WO2011/131525
PCT Pub. Date: Oct. 27, 2011

(65) Prior Publication Data
US 2013/0037331 A1    Feb. 14, 2013

(30) Foreign Application Priority Data
Apr. 21, 2010  (DE) .......................... 10 2010 015 713

(51) Int. Cl.
| | | |
|---|---|---|
| B62D 11/02 | (2006.01) | |
| B62D 11/06 | (2006.01) | |
| B62D 7/04 | (2006.01) | |
| B62D 7/14 | (2006.01) | |
| B62D 11/16 | (2006.01) | |
| B62D 11/20 | (2006.01) | |

(52) U.S. Cl.
CPC *B62D 7/04* (2013.01); *B62D 7/142* (2013.01); *B62D 11/16* (2013.01); *B62D 11/20* (2013.01)
USPC ............ 180/6.2; 180/6.5; 180/65.1; 180/218; 180/264; 180/267

(58) Field of Classification Search
USPC ............... 180/6.2, 6.28, 6.44, 6.48, 6.5, 218, 180/65.1, 65.51, 65.6, 252, 264, 265, 266, 180/267
See application file for complete search history.

(56) References Cited

U.S. PATENT DOCUMENTS

| | | | |
|---|---|---|---|
| 1,619,616 A * | 3/1927 | Ionides .......................... 180/264 |
| 3,827,517 A | 8/1974 | Williamson | |
| 5,350,033 A * | 9/1994 | Kraft ............................... 180/167 |
| 5,735,416 A * | 4/1998 | Jussila .......................... 212/344 |
| 5,829,542 A * | 11/1998 | Lutz ............................. 180/65.6 |
| 5,910,060 A * | 6/1999 | Blume ............................. 475/28 |

(Continued)

FOREIGN PATENT DOCUMENTS

| | | |
|---|---|---|
| DE | 10 2004 014 773 A1 | 2/2005 |
| JP | 55-039846 | 3/1980 |

(Continued)

*Primary Examiner* — Joseph Rocca
*Assistant Examiner* — Marc A Scharich
(74) *Attorney, Agent, or Firm* — Davidson, Davidson & Kappel, LLC

(57) ABSTRACT

A displaceable system is provided including at least one set of at least two wheels arranged in pairs for movement in a plane, the set being disposed on at least one wheel axle parallel to the plane. A single electric drive motor, a differential having variable torque distribution, and an electric servomotor are provided on the wheel axle for both wheels of a set. The electrical servomotor acts on the differential such that the torque generated by the single electric drive motor is distributed within the wheel axle individually to the wheels.

10 Claims, 4 Drawing Sheets

(56) References Cited

U.S. PATENT DOCUMENTS

| | | | |
|---|---|---|---|
| 5,967,348 A * | 10/1999 | Jussila | 212/344 |
| 6,267,188 B1 * | 7/2001 | Bowman et al. | 180/24.03 |
| 7,137,470 B2 * | 11/2006 | Gotz | 180/264 |
| 7,497,286 B2 * | 3/2009 | Keller et al. | 180/65.6 |
| 7,703,568 B2 * | 4/2010 | Ishii | 180/218 |
| 7,789,175 B2 * | 9/2010 | Tobey et al. | 180/65.1 |
| 7,984,910 B1 * | 7/2011 | Nielsen | 273/359 |
| 8,267,205 B2 * | 9/2012 | Ishii et al. | 180/6.44 |
| 8,336,655 B2 * | 12/2012 | Knoblauch | 180/65.6 |
| 8,720,634 B2 * | 5/2014 | Takahashi et al. | 180/252 |
| 2005/0034912 A1 | 2/2005 | Gotz | |
| 2005/0067199 A1 * | 3/2005 | Shimizu | 180/65.1 |
| 2006/0225930 A1 * | 10/2006 | Schulte | 180/65.4 |
| 2008/0111327 A1 * | 5/2008 | Rhodes et al. | 280/5.514 |
| 2011/0094815 A1 * | 4/2011 | Terry | 180/264 |
| 2012/0031691 A1 * | 2/2012 | Fuechtner et al. | 180/65.6 |

FOREIGN PATENT DOCUMENTS

| | | |
|---|---|---|
| JP | 2004-090903 | 3/2004 |
| JP | 2008-213570 | 9/2008 |
| WO | WO 2009/082496 A1 | 7/2009 |

* cited by examiner

MOVABLE SYSTEM

MOVABLE SYSTEM

The invention relates to a movable system. In particular, the invention relates to a movable system that, for purposes of movement in a plane, has at least one set of wheels arranged in pairs on individual wheel axles that are parallel to the plane. In this case, the set is configured overall so that it can rotate around at least one axis that is essentially perpendicular to the wheel axles and to the plane.

BACKGROUND OF THE INVENTION

German laid-open document DE 10 2004 014 773 A1 discloses a drive device for a fluorine transport vehicle. The fluorine transport vehicle has a bogy that can rotate around a vertical axis and two drive wheels that are mounted on the bogy parallel and mirror-symmetrically to the vertical axis. There is a means for creating a differential effect, which is arranged between the two drive wheels. According to an embodiment for creating a differential effect between the two drive wheels, there is an electric twin-rotor engine having two rotors and a shared stator. Each rotor is coupled directly or indirectly to an adjacent drive wheel.

International patent application WO 2009/082496 A1 discloses a device for transporting buildings. Here, the building to be transported rests on a support structure that, in turn, comprises four movable systems, each having at least two wheels. Each of the wheels of a movable system is associated with a motor that drives that particular wheel. A control system allows the operator to control the transport system. For this purpose, the individual motors on the movable system are actuated accordingly so that then entire transport system can be moved in the intended direction or to the intended position.

Japanese patent application JP 2004-090903 also describes a movable system comprising at least two wheels that are arranged on an axle. By the same token, the movable system can be rotated around an axis that is perpendicular to the wheel axle. An individual drive is associated with each wheel of the movable system. The movable system can be steered and controlled appropriately by suitably controlling the individual drives of the wheels.

Japanese patent application JP 55-039846 likewise discloses a transport system that is equipped with several movable systems. The movable systems can be controlled in such a way as to ensure that the transport system can move around corners of a building or of a warehouse. Each movable system of the transport system comprises two individual wheels that are each equipped with their own drives. Therefore, the transport system can be moved around the corners in a controlled manner by suitably controlling the drives of the wheels of each movable system.

U.S. Pat. No. 3,827,517 likewise discloses a movable system comprising two wheels that are arranged in a yoke. Each wheel here is associated with its own motor. The motor is driven hydrostatically.

Japanese patent application JP 2008-213570 likewise describes a movable system comprising two wheels that are arranged on a shared wheel axle. Furthermore, there is an axis that is perpendicular to the wheel axle and to the plane of movement of the movable system. The movable system can be rotated around this axis. Each wheel of the movable system is associated with a drive system. The drive systems for each wheel are configured identically.

SUMMARY OF THE INVENTION

It is an object of the present invention to provide a movable system that is inexpensive and that can be used in many types of running gear in a wide array of application areas.

It is an object of the present invention to provide a drive unit that is integrated into the wheel or in the vicinity of the wheel, said drive unit being associated with or integrated into a movable system. The movable system is configured to move in a plane. The movable system usually has a set of at least two wheels arranged in pairs and which is arranged on at least one wheel axle that is parallel to a plane. Moreover, the set and thus also the movable system in its entirety are configured so that it can rotate around at least one axis that is essentially perpendicular to the wheel axles and to the plane. A single electric drive motor, a differential with a variable torque distribution and an actuator are provided on the wheel axle for the at least two wheels of a set. In a preferred embodiment, the actuator can be configured as an electric motor actuator. The drive unit for the movable system is thus made up of the electric drive motor, the differential and the actuator (or electric motor actuator). The electric actuator acts on the differential in such a way that the torques generated by the single electric drive motor can be distributed within the wheel axle individually to each wheel. The wheel axle has a split configuration so that the at least two wheels arranged in pairs on the wheel axle or on the wheel axles can be driven individually in pairs.

The invention makes it possible to drive and/or to steer two or more wheels electrically via a differential effect. This is already used nowadays in a similar manner in airplane running gear as well as in fork lifts that have electrically driven wheels mounted in pairs on rotatable axles. These wheels, which are preferably arranged in pairs, can turn around their own axes like the castors of a desk chair or else they can be used with appropriately arranged multi-articulated kinematics for track-type vehicles and rescue vehicles of all kinds. The inventive embodiment of the movable system can be used for all kinds of vehicles or vehicle-like devices such as, for example, fork lifts or wheelchairs, which can also be guided.

The set of wheels arranged on the wheel axle that is parallel to the plane can be pivoted around another axis that is arranged parallel to the plane and perpendicular to the wheel axle or wheel axles.

When the actuator or the electric motor actuator is inactive, the torques distributed individually to each wheel arranged on the wheel axles are of the same magnitude. When the actuator or the electric motor actuator is active, the torques distributed individually to each wheel arranged on the wheel axles of the movable system are of a different magnitude. Due to this difference, the set can be rotated in its entirety around the axis that is essentially perpendicular to the wheel axles and to the plane. Consequently, owing to the rotation of the set around the axis that is essentially perpendicular to the wheel axles and to the plane, it is possible to steer a vehicle precisely and in tight spaces.

The differential with the variable torque distribution that is arranged between the drive motor and the actuator or electric motor actuator comprises two identical planetary gears. The individual distribution of the torques to the wheels of a set is done steplessly via the active torque of the actuator.

According to one embodiment, the actuator can be configured as an electric motor actuator. The power of the electric motor actuator is less than the power of the drive motor. The power of the electric motor actuator can be at least ten times less than that of the electric drive motor. The electric drive motor and the electric actuator are configured as hollow-shaft motors.

The movable system is associated with a sensor system by means of which the states of the movable system can be detected. The states that are to be detected with the sensor system are the forces and/or torques that act in the movable system. Moreover, the sensor system can comprise a measuring system with which distances and/or positions and/or accelerations are detected.

Communication electronics can be provided by means of which the analog signals and/or digital data detected by the sensor system are transmitted to a control system. Power electronics can be integrated into the drive motor and/or into the actuator. For the cooling of the power electronics and/or of the drive motor and of the actuator (or electric motor actuator), a cooling system can be provided that works with all kinds of coolants known from the state of the art. The data or signals can be transmitted from the sensor system or systems to the control system by means of wireless transmission. The control system handles a driving-dynamic and model-based regulation of the at least one movable system. Each of the movable systems can be provided with distance sensors that detect possible hindrances that limit the free movement of the movable systems. Many of the elements of the movable system can also be made of lightweight construction materials such as, for example, plastic, fiber-reinforced plastic, aluminum, magnesium, etc.

The wheels arranged on a movable system are not limited to a configuration with two wheels. The wheels can be arranged on the axles of a movable system in all kinds of embodiments. For instance, the wheels can have different diameters. By the same token, the wheels that are arranged at least in pairs can be configured with a camber and/or with a skewed angle.

The movable system can be pivoted around another axis, whereby this axis is oriented essentially parallel to the plane and perpendicular to the wheel axles. The pivoting axis can also be installed off-centered with respect to an imaginary connection line of the wheels arranged on the axles. The invention makes it possible to produce a highly integrated wheel support unit into which the drive, steering, brakes, springs and shock absorber unit are integrated. With the invention, not only is the steering advantageously achieved by means of the E-differential, but it also meets also the crucial requirement for the system to be fail-safe. In the de-energized state, the motor actuator for the variable torque distribution would then switch the system to be torque-free and thus make it impossible for the wheels to be blocked. Due to the compact arrangement of the drive motor, the differential and the motor actuator, it is also possible to use the invention in wheelchairs, forklifts and hospital beds. Moreover, the invention can be used in construction machinery and in the realm of transport vehicles. A special advantage of the present invention is that only one single drive motor is required, as a result of which the two wheels of the movable system do not have to be provided with two identical motors having the same drive power.

BRIEF DESCRIPTION OF THE DRAWINGS

Below, embodiments of the invention and its advantages will be explained in greater detail with reference to the accompanying figures.

DETAILED DESCRIPTION

Figure 1:
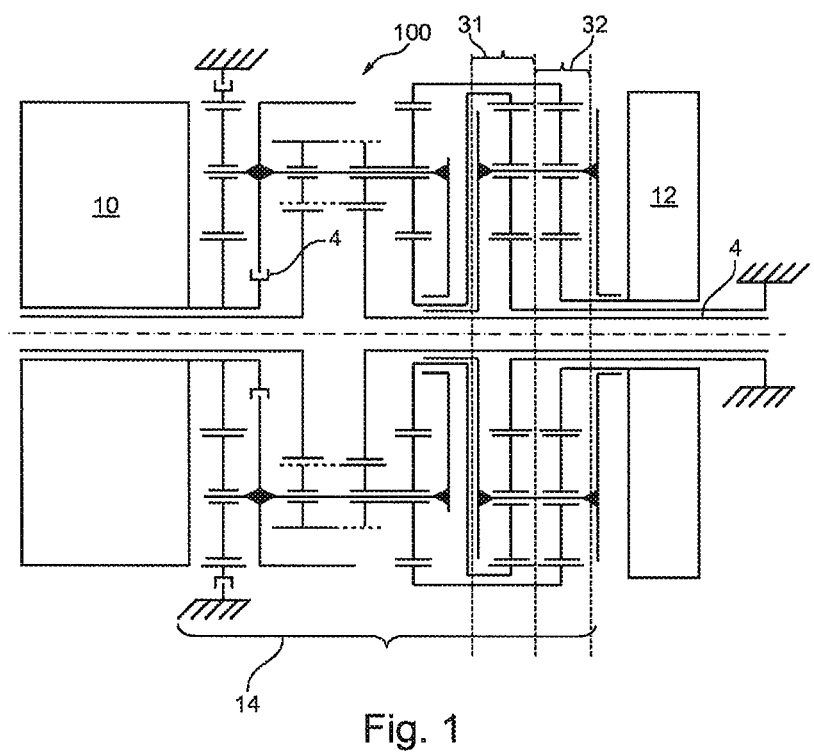
FIG. 1 schematically shows the structure of a drive system for variable torque distribution, according to the state of the art.

Identical reference numerals are used for the same elements of the invention or for elements that have an equivalent effect. Moreover, for the sake of clarity, the individual figures only show the reference numerals that are needed for the description of that particular figure. The embodiments shown are merely examples of ways in which the movable system according to the invention can be configured. Consequently, they do not constitute a conclusive limitation of the invention. In the description below, the actuator 12 used for initiating the variable torque distribution is designated as a motor actuator. The electric actuator is thus a conceivable version of how the actuator 12 can be configured. The fact that the description is limited to using to the term "electric motor actuator" should not be construed as a limitation of the invention. It is obvious to the person skilled in the art that the actuator 12 can be configured technically differently.

FIG. 1 shows a schematic view of the system 100 for the variable torque distribution within at least one axle 4 of a vehicle (not shown here). The embodiment of the system 100 is sufficiently known from the state of the art. A drive motor 10 is provided that acts on a differential 14 with a variable torque distribution. In this context, the differential 14 comprises two identical planetary gears 31 and 32. A motor actuator 12 acts on the planetary gears 31 and 32. According to the preferred embodiment, the drive motor 10 is configured as an electric motor. The motor actuator 12 is likewise configured as an electric motor. Here, the power of the drive motor 10 is at least ten times more than the power of the motor actuator 12.

Figure 2:
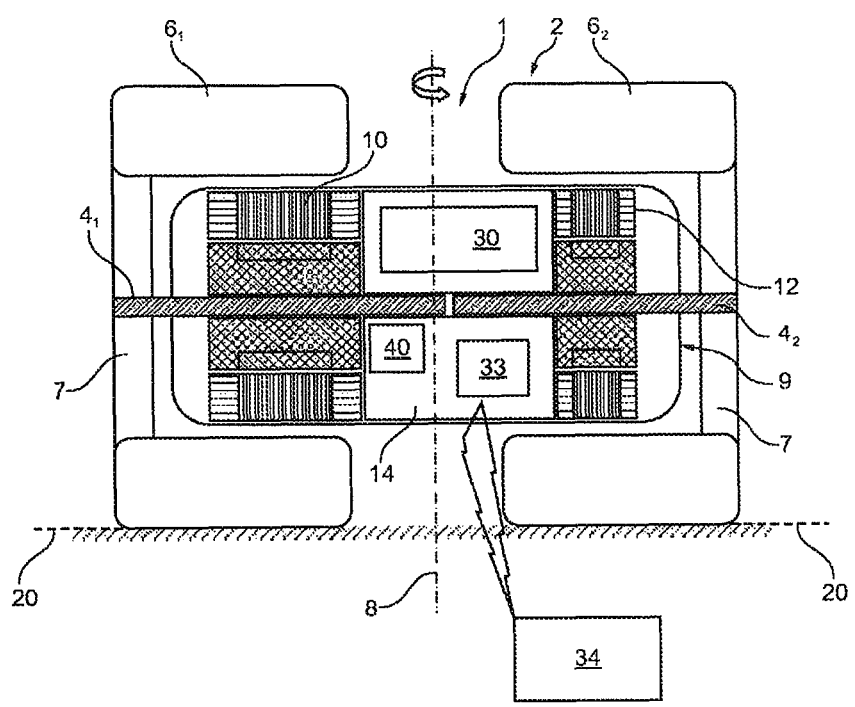
FIG. 2 shows a schematic view of the movable system according to the invention in which the drive motor, the differential and the motor actuator are arranged on the wheel axle.

FIG. 2 shows a schematic view of the movable system 1 according to the invention. The movable system 1 comprises a first wheel $6_1$ and a second wheel $6_2$, which are both arranged on wheel axles $4_1$, $4_2$. Of course, more than one wheel $6_1$ and $6_2$ can be shown on each of the wheel axles $4_1$, $4_2$. In the following figures, only one wheel $6_1$ or $6_2$ is provided on each of the wheel axles $4_1$, $4_2$, which should not be construed as a limitation of the invention.

Here, the two wheels $6_1$ and $6_2$ are arranged on the wheel axles $4_1$, $4_2$ in such a way that they can rotate in different directions independently of each other. The wheel axles $4_1$, $4_2$ can be arranged in different orientations with respect to each other. The movable system 1 thus comprises a set 2 of two wheels $6_1$ and $6_2$ that are each attached to a rim 7 and are thus configured so that it can rotate around the wheel axle 4. The wheel axle 4 here is oriented essentially parallel to a plane 20 in which the movable system can move when it is actuated. A drive unit 9 is arranged on the wheel axle 4 of the movable system 1. The drive unit 9 comprises an electric drive motor 10, a differential 14 and an actuator 12. The movement of the movable system 1 within the plane 20 is effectuated with the single electric drive motor 10. The movable system is controlled and steered by the electric motor actuator 12 that thus makes it possible for the drive torque of the single electric drive motor 10 to be distributed individually to each of the wheels $6_1$ and $6_2$ within the wheel axle 4. The movable system 1 is configured here in such a way that it is likewise configured so that it can rotate around an axis 8 that is perpendicular to the wheel axle and perpendicular to the plane 20.

Furthermore, the movable system 1 can be provided with a sensor system 30 by means of which states of the movable system 1 can be detected. Via communication electronics 33, the analog signals and/or digital data detected by the sensor system 30 are transmitted to a control system 34. The control system 34 handles a driving-dynamic and model-based regulation of the at least one movable system. Power electronics 36 can be integrated into the drive motor 10 and/or into the actuator 12. Each set 2 of wheels $6_1$, $6_2$ arranged at least in pairs on wheel axles $4_1$, $4_2$ that are essentially parallel to the plane 20 is equipped with a GPS system 40, so that the position of each set in space can be determined. A wireless transmission can be established between the communication electronics 33 and the control system 34.

Figure 3:
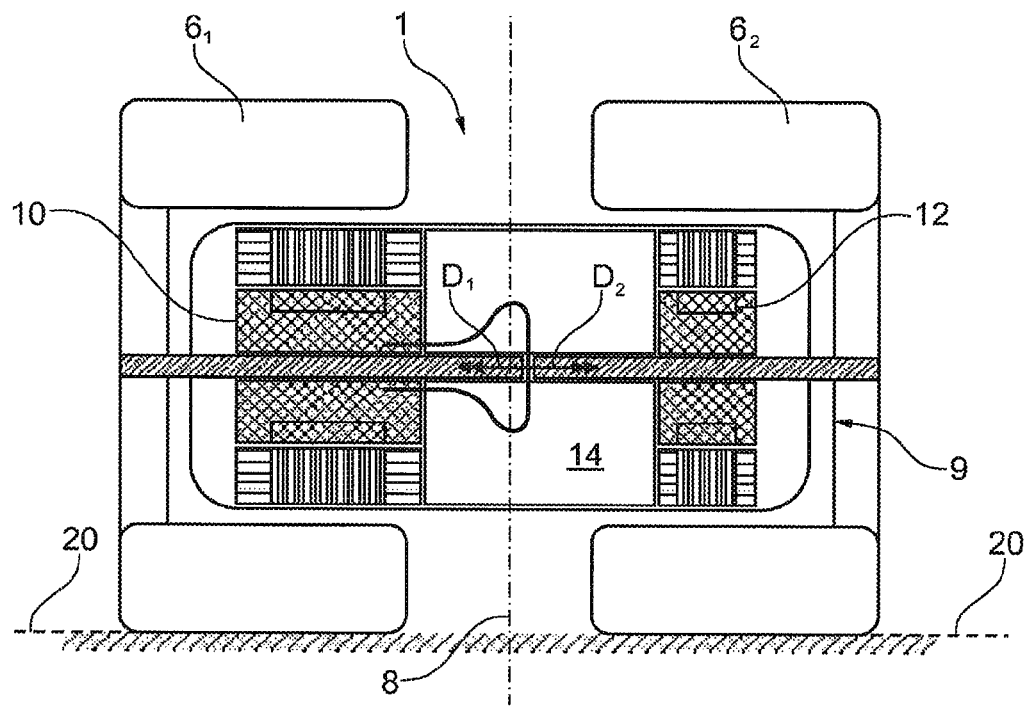
FIG. 3 shows a scenario in which the motor actuator is inactive, resulting in a distribution of the equal torques to the wheels of the movable system that are arranged on the wheel axle.

FIG. 3 shows a scenario in which torques of the same magnitude act on the wheels $6_1$ and $6_2$ of the movable system 1. This is achieved in that the electric motor actuator 12 is inactive. Consequently, the two wheels $6_1$ and $6_2$ of the electric system are driven by means of the single electric drive motor 10. Identical torques $D_1$ and $D_2$ are applied to the wheels $6_1$ and $6_2$ of the movable system 1. Thus, the movable system 1 moves straight ahead within the plane 20.

Figure 4:
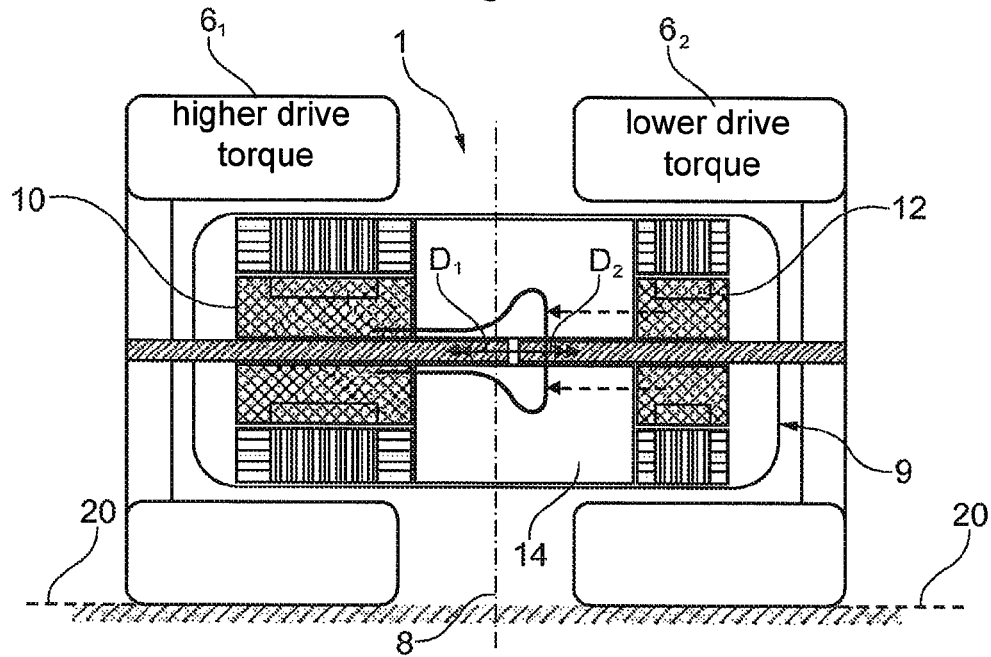
FIG. 4 shows a scenario in which the motor actuator is active and thus performs a distribution of different torques to the wheels of the movable system.

FIG. 4 shows a scenario in which the electric motor actuator 12 is active. Due to the activity of the electric motor actuator 12, the drive torques $D_1$ and $D_2$ distributed to the wheels $6_1$ and $6_2$ of the movable system are different. In the scenario shown in FIG. 4, a higher drive torque acts on the first wheel $6_1$ than on the second wheel $6_2$ of the movable system. The result of the distribution of the drive torques $D_1$ and $D_2$ as shown here is that the movable system 1 rotates around the axis 8, which thus allows the movable system 1 to be steered. It is obvious to a person skilled in the art that several movable systems can be provided for one vehicle. By appropriately controlling the individual electric motor actuators 12 of the drive units 9 of the individual movable systems, the vehicle (not shown here) can be controlled very precisely.

Figure 5:
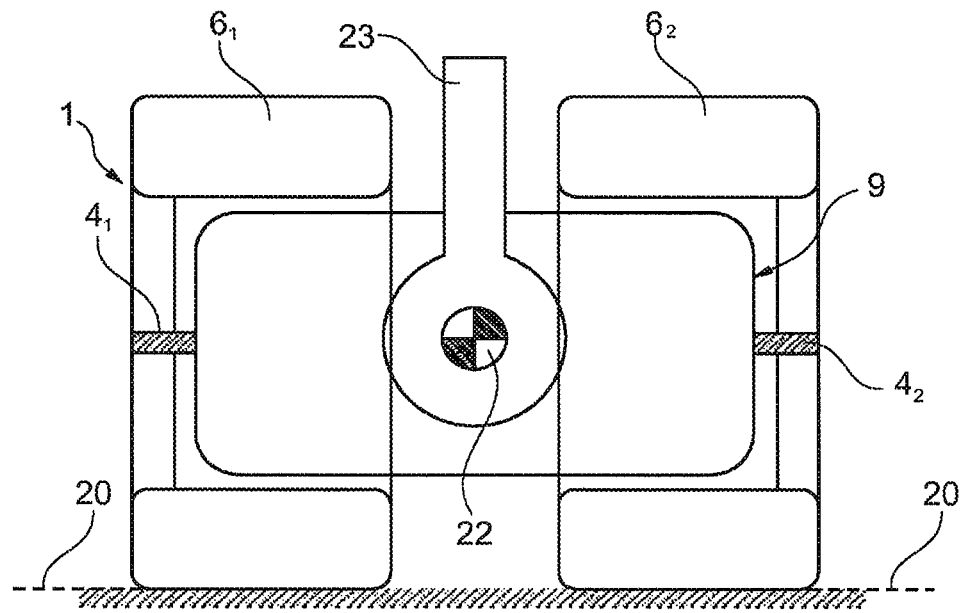
FIG. 5 shows the installation of the movable system in a vehicle.

FIG. 5 shows the installation of the movable system of the first wheel $6_1$ and the second wheel $6_2$ in a vehicle (not shown here). Here, the installation element 23 can be pivoted around another axis 22 that is oriented perpendicular to the wheel axle 4 and parallel to the plane 20.

Figure 6:
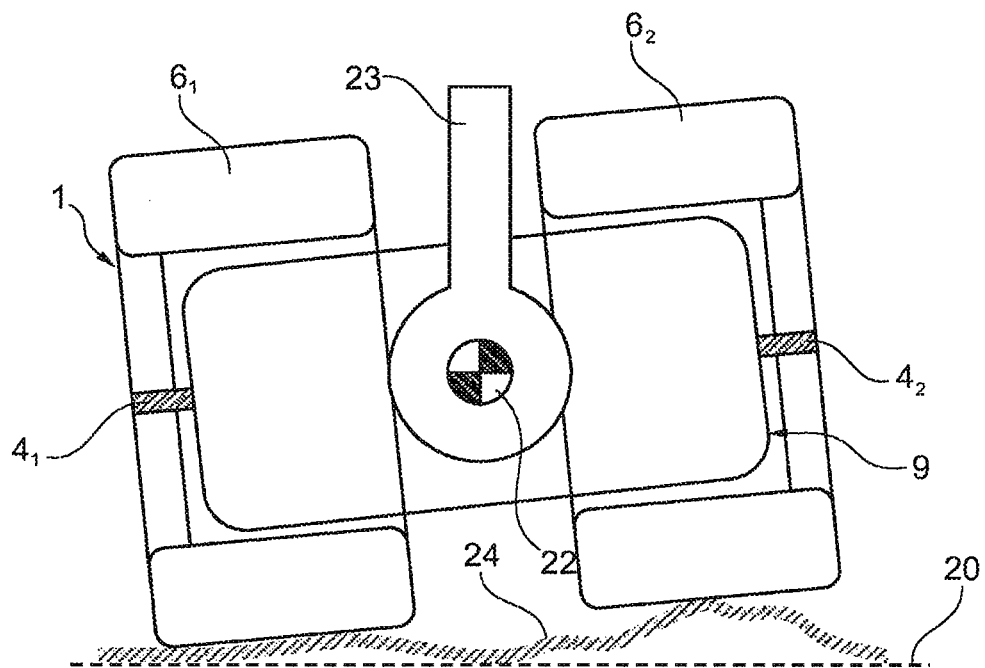
FIG. 6 shows the installation of the movable system in a vehicle and its pivoting in response to uneven ground.

FIG. 6 shows a scenario in which the movable system 1 is running over uneven ground 24 that is present within the plane 20. In this case, the movable system 1 pivots around the axis 22 that runs through the installation element 23 and essentially likewise through the wheel axle 4. This possibility of pivoting around the axis 22 always ensures that the wheels $6_1$ and $6_2$ of the movable system 1 stay in contact with the ground.

The invention was described with reference to a preferred embodiment. It is obvious to the person skilled in the art that changes and modifications can be made without departing from the protective scope of the claims below.

What is claimed is:

1. A movable system for movement in a plane, the movable system comprising:
    at least one set of wheels, the at least one set of wheels including a first wheel and a second wheel arranged side-by-side as a pair;
    at least one wheel axle including a first wheel axle for the first wheel and a second wheel axle for the second wheel, the first wheel axle and the second wheel axle being parallel to the plane, the first wheel being arranged on the first wheel axle, the second wheel being arranged on the second wheel axle, the first wheel and the second wheel being rotatable around at least one axis perpendicular to the first wheel axle, to the first second wheel axle and to the plane;
    a single electric drive motor;
    a differential with a variable torque distribution; and
    an actuator, the drive motor, the differential and the actuator being provided as a drive unit located on the first and second wheel axles, the actuator being separate from the drive motor and acting on the differential in such a way that torques generated by the single electric drive motor are distributable within the first and second wheel axles individually to the first and second wheels;
    wherein the actuator is an electric motor actuator having a power less than a power of the drive motor.

2. The movable system as recited in claim 1 wherein the first wheel and the second wheel are pivotable around another axis arranged parallel to the plane and essentially perpendicular to the first and second wheel axles.

3. The movable system as recited in claim 1 wherein when the actuator is inactive, the torques distributed individually to each of the first wheel and the second wheel are of the same magnitude.

4. The movable system as recited in claim 1 wherein when the actuator is active, the torques distributed individually to each of the first wheel and the second wheel are of a different magnitude, so that the first wheel and the second wheel are rotatable together around the axis essentially perpendicular to the first and second wheel axles and to the plane.

5. The movable system as recited in claim 1 wherein the differential includes two essentially identical planetary gears.

6. The movable system as recited in claim 1 wherein the electric drive motor and the electric motor actuator are hollow-shaft motors.

7. The movable system as recited in claim 1 further comprising a sensor system capable of detecting states of the movable system.

8. The movable system as recited in claim 1 further comprising communication electronics capable of transmitting analog signals and/or digital data to a control system.

9. The movable system as recited in claim 1 further comprising power electronics integrated into at least one of the drive motor and the actuator.

10. The movable system as recited in claim 1 further comprising a GPS system for the first and second wheels, so that a position of the first and second wheels in space is determinable.

* * * * *